Feb. 17, 1959  O. H. DRÄGER  2,873,662
SHOCK PRESSURE VALVE FOR SHELTERS
Filed June 10, 1955  2 Sheets-Sheet 1

INVENTOR
Otto Heinrich Dräger
BY Bailey, Stephens & Huettig
ATTORNEYS

Feb. 17, 1959     O. H. DRÄGER     2,873,662
SHOCK PRESSURE VALVE FOR SHELTERS

Filed June 10, 1955     2 Sheets-Sheet 2

INVENTOR
*Otto Heinrich Dräger*

BY
*Bailey, Stephens & Huettig*
ATTORNEYS

United States Patent Office 2,873,662
Patented Feb. 17, 1959

2,873,662

SHOCK PRESSURE VALVE FOR SHELTERS

Otto Heinrich Dräger, Lubeck, Germany

Application June 10, 1955, Serial No. 514,677

Claims priority, application Germany February 24, 1955

2 Claims. (Cl. 98—119)

This invention relates to air exhaust protection means for shelters such as air raid shelters. In particular, the invention is directed to the use of protective excess pressure valves for the ventilation exhaust ducts of shelters.

Ordinarily an excess, or super-atmospheric, pressure is maintained in air raid shelters in order to prevent outside gases from entering the shelter. This excess pressure is obtained by means of suitable air supply devices, such as pumps, that supply filtered fresh air to the shelter, and by arranging excess pressure valves in the exhaust duct from the shelter. The excess pressure valves, at the same time, must be constructed as check or flap valves so that the exhaust duct is automatically shut off from the outside air when the intake air supply means fails to work.

Excess pressure valves are known which are constructed so that the center of gravity of the swingable parts is, in the closed position of the valve, in a position such that the resistance of the valve to the air passing through the exhaust duct does not change or even decreases upon the passage of increasing quantities of air. Such valves have the advantage in that they ensure an invariable, or almost invariable, excess pressure within the shelter regardless of variations of the quantity of exhaust air.

The obects of the invention are to produce a means for protecting the excess pressure valves against sudden increases in the pressure of the outside air, to produce a protective valve which will open at a lower exhaust air pressure than is needed for the operation of the excess pressure valve, and to produce a protective valve which affords no additional air resistance in the exhaust duct in which the ventilation is normally regulated by the excess pressure valve.

In general, these objects are obtained by mounting a protective flap valve on the end of the exhaust duct on the outlet side of the excess pressure valve. This flap valve is preferably a very strong structure, and it can take the form an impact resisting plate. The purpose of this valve is to protect the excess pressure valve and the interior of the shelter from the blast of a bomb explosion. In the form of a flap valve, the structure is such that its pivoting closing movement, and consequently its resistance to the air passing through the exhaust duct, remains invariable, or almost so, upon the increasing opening of the valve, so that the protective flap valve does not impede the normal ventilation of the shelter.

In another form of the invention, the flap valve is in normal open position, the valve being hinged such that gravity maintains the valve in open position. Again, the protective flap valve can be held in open position by a spring. When the large outside pressure occurs, the force of gravity, or that of the spring, will be overcome to close the protective valve.

The protective valve in any case is made strong enough to resist the highest expected pressure, such as that produced by an explosion of an atomic bomb, which will create air pressures of from 10 to 100 atmospheres or more. It is preferred that the weight of the protective flap, needed to give it the necessary strength, does not exceed that which is needed to resist the highest expected pressures.

The various modifications of the invention are more fully described with reference to the accompanying drawings, in which.

Figure 1:
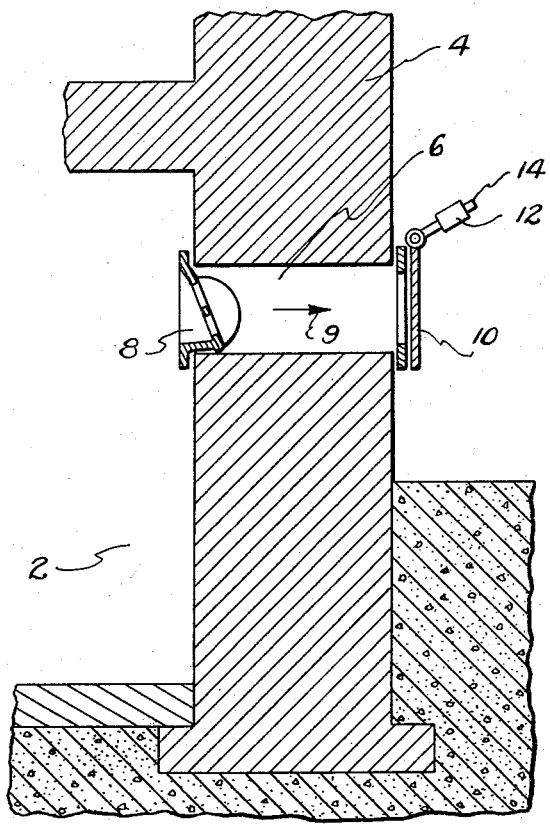
Figure 1 is a cross-sectional view through the protective valve mounted on the wall of the shelter.

In Figure 1 the air raid shelter 2 is partially enclosed by an outside wall 4. An air exhaust duct 6 has a lightweight pressure flap valve 8 mounted in the inner side of duct 6. Exhausted air flows through duct 6 in the direction of the arrow 9. On the outside of the wall covering the exhaust port of duct 6 is hingedly mounted a pressure-protective flap valve 10. This valve may be kept in normal closed position. However, the opening resistance of flap valve 10 is regulated by adjusting counter-weight 12 slidably mounted upon arm 14. Preferably valve 10 is so adjusted that it will open at an air pressure less than that needed to open excess pressure valve 8.

In the event of an explosion of a bomb outside of the shelter, the air blast will close valve 10 before the air pressure moving in a direction contrary to that of the arrow 9 can hit the excess pressure valve 8.

Figure 3:
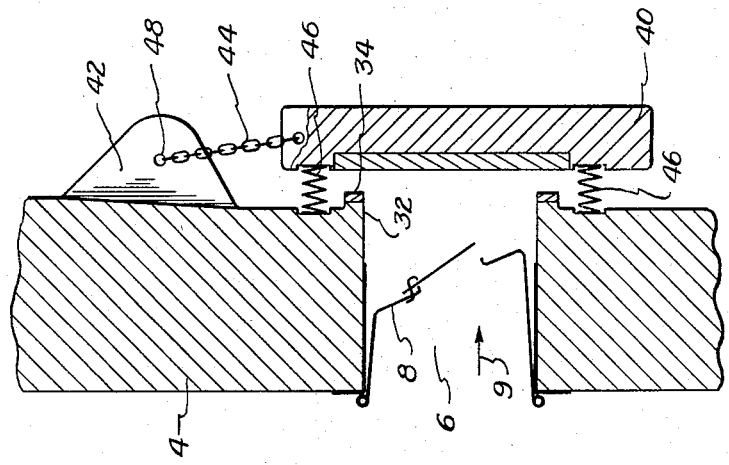
Figure 3 is a cross-sectional view through a further modification of a protective valve.
Figure 2:
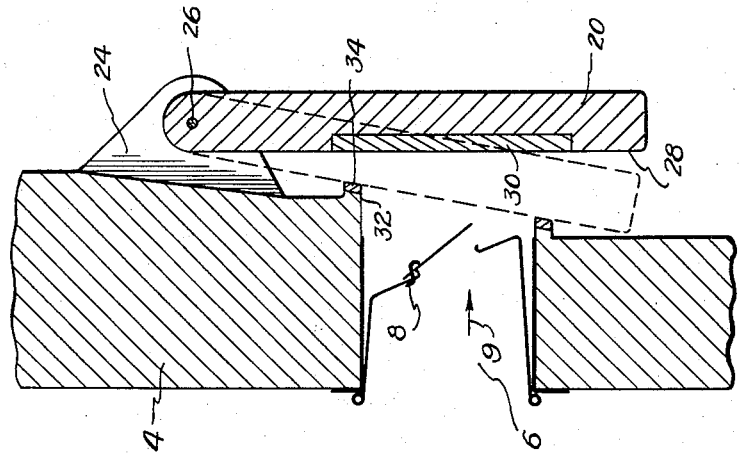
Figure 2 is a cross-sectional view of a modified form of protective valve.

In the embodiments of the invention shown in Figures 2 and 3, the exhaust air duct again passes through shelter wall 4, and has an excess pressure valve arranged therein, with the exhaust air passing in the direction of the arrow 9.

In Figure 2, on the outside wall of the shelter a protective flap valve 20 is hung from a projection 24 by means of hinge pins 26. Flap valve 20 can be composed of a brick, or a concrete slab, or the like. The inner face 28 of flap 20 is provided with a lining of sealing material 30 composed of such materials as rubber, asbestos, fiber or wood. This lining can be shaped only so that it will conform with a rim 32 surrounding the outlet port of exhaust duct 6. In turn this rim may be surfaced with flexible material 34. Rim 32 is inclined with respect to the vertical, and is so arranged that when flap 20 is closed, as indicated by the dotted lines, the flap bears with its inner surface 28 or lining 30 evenly on surfacing 34. Normally flap 20 depends from hinge pin 26 in a vertical plane by reason of its own weight. Upon an increase of outside pressure, the protective flap 20 swings into closed position and thus seals the outlet of exhaust duct 6.

The space between rim 32 and the inner face 28 of flap 20 is predetermined so as not to offer any appreciable resistance to the air exhausted from duct 6.

In Figure 3, the protective flap valve 40 is suspended from protuberance 42 by means of a chain 44. Flap 40 is held in open position, that is spaced from rim 32, by means of springs 46. The strength of the springs varies in accordance with the type of suspension, and in some cases may be omitted altogether. Thus if the point of suspension 48 is exactly above the center of gravity of protective flap 40, when the flap is in the position as illustrated in the drawing, springs 46 are not needed. However, as the place of suspension is moved to the left in Figure 3, the springs need to be stronger in order to hold the flap 40 away from rim 32.

As in the case of the other forms of the invention, should an air blast occur outside of the shelter, the impact of the air against flap 40 will close the flap against rim 32 and thus protect valve 8 and the interior of the shelter.

Having now described the means by which the objects of the invention are obtained, I claim:

1. In a shelter having a wall with an inside surface and an outside surface exposed to the atmosphere, an exhaust duct passing through said wall, and an excess pressure air exhaust valve mounted in said duct, the improvement comprising a heavy flap valve chain means for hanging said flap valve upon the outside surface of said wall and overlying in spaced relationship the outlet of said duct and being adapted to close said outlet under the impact of outside pressure, and spring means between the flap valve and the outside surface of said wall for holding said flap valve spaced from the outlet of said duct under normal pressures.

2. In a shelter having a wall with an inside surface and an outside surface exposed to the atmosphere, an exhaust duct passing through said wall, and a lightweight excess pressure air exhaust flap valve mounted in said duct, the improvement comprising a heavy flap valve overlying the outlet end of said duct, a chain secured to the upper end of said heavy flap valve and to the outside surface of said wall above said heavy flap valve for movably hanging said heavy flap valve, and springs mounted between said wall and said heavy flap valve for holding said heavy flap valve in normal spaced relationship with respect to the outlet end of said duct.

References Cited in the file of this patent

UNITED STATES PATENTS

| | | |
|---|---|---|
| 181,272 | Lane | Aug. 22, 1876 |
| 1,064,951 | Wofford | June 17, 1913 |
| 1,493,655 | Vernon | May 13, 1924 |
| 2,022,959 | Gordon | Dec. 3, 1935 |
| 2,138,427 | Payden | Nov. 29, 1938 |
| 2,224,494 | White | July 10, 1939 |
| 2,452,612 | Swenberg | Nov. 2, 1948 |
| 2,737,879 | Cooke et al. | Mar. 13, 1956 |

FOREIGN PATENTS

| | | |
|---|---|---|
| 43,669 | Netherlands | July 15, 1938 |
| 212,163 | Switzerland | Feb. 3, 1941 |